United States Patent [19]
Tsuchiya et al.

[11] Patent Number: 6,147,596
[45] Date of Patent: Nov. 14, 2000

[54] VEHICLE-MOUNTED RECORD MEDIUM REPRODUCING APPARATUS

[75] Inventors: Yasunobu Tsuchiya; Toru Takeuchi; Sadao Nagata; Yoshiya Isezaki; Kazuhiro Ido; Toshiharu Fujiwara, all of Tokyo, Japan

[73] Assignee: Clarion Co., Ltd., Saitama-Ken, Japan

[21] Appl. No.: 09/225,703

[22] Filed: Jan. 6, 1999

[30] Foreign Application Priority Data

| Jan. 7, 1998 | [JP] | Japan | 10-013408 |
| Jan. 7, 1998 | [JP] | Japan | 10-013409 |
| Jan. 26, 1998 | [JP] | Japan | 10-027719 |
| Jan. 26, 1998 | [JP] | Japan | 10-027720 |
| Jan. 26, 1998 | [JP] | Japan | 10-027721 |

[51] Int. Cl.$^7$ .................................................. B60Q 1/00
[52] U.S. Cl. ..................... 340/425.5; 340/426; 381/86; 455/352; 455/346; 379/58
[58] Field of Search ........................ 340/426, 425.5, 340/990; 381/86; 455/352, 151.1, 346; 379/58, 40, 59; 345/173

[56] References Cited

U.S. PATENT DOCUMENTS

| 5,109,420 | 4/1992 | Nonaka | 381/86 |
| 5,537,673 | 7/1996 | Nagashima et al. | 455/346 |
| 5,742,666 | 4/1998 | Alpert | 379/58 |
| 5,794,164 | 8/1998 | Beckert et al. | 701/1 |
| 5,859,628 | 1/1999 | Ross et al. | 345/173 |

*Primary Examiner*—Benjamin C. Lee
*Attorney, Agent, or Firm*—Hogan & Hartson LLP

[57] ABSTRACT

A vehicle-mounted record medium reproducing apparatus having a personal computer function. The apparatus is equipped with a control panel tiltable manually through a tilting link mechanism provided to cover a record medium insertion opening of a reproducing apparatus body. Further, the apparatus is provided with a click sensation mechanism for providing a click sensation when the control panel is tilted to a record medium ejecting position, and further provided with a connecting member for establishing a connection between the control panel and the supporting plate and being released from its connecting condition when the supporting plate is moved to a connection release enabling position. With this apparatus, a record medium can be inserted and ejected safely and with certainty, and the control panel can be detached from the supporting plate in a safe condition.

17 Claims, 18 Drawing Sheets

VEHICLE-MOUNTED RECORD MEDIUM REPRODUCING APPARATUS

BACKGROUND OF THE INVENTION

1. Field of the Invention

The present invention relates to a vehicle-mounted record medium reproducing apparatus equipped with a control panel which is tiltable to cover an insertion opening for a record medium in a front surface of a reproducing apparatus body and further equipped with a personal computer function.

2. Description of the Prior Art

In general, in vehicle-mounted record medium reproducing apparatus such as a CD players, it is known to provide such apparatus with a motor-driven and tiltable control panel in a front surface of the reproducing apparatus body to cover an insertion opening for a record medium. In this type of apparatus, a motor for tilting the control panel is provided within the reproducing apparatus body. In addition, vehicle-mounted record medium reproducing apparatus is known in which a tiltable supporting plate is provided in the front surface of the reproducing apparatus body to cover the record medium insertion opening and a control panel is detachably fitted through a connecting member to the supporting plate. This type of apparatus is designed such that, when the vehicle driver leaves the motor vehicle, the control panel can be removed to prevent theft.

In recent years, there has been a tendency to combine types of systems such as a vehicle-mounted audio systems with vehicle-mounted navigation systems. An extension of this is record medium reproducing apparatus capable of performing various kinds of operations such as a personal computer function, security and radiocommunication.

Vehicle-mounted record medium reproducing apparatus having a personal computer function is expected to use a compact flash card including, for example, a memory card, a pager receive card, and other cards. Due to mounting on a motor vehicle, improvement of the cards in operational performance, safety, vibration resistance and others is essential.

In addition, because the number of parts such as electric devices increases substantially in such apparatus, there is no room to provide a motor for tilting a control panel in the reproducing apparatus body.

In the case of a mechanism for manually tilting the control panel, after the control panel is tilted manually, an operation is conducted, such as inserting a record medium into the reproducing apparatus body or ejecting the record medium from the reproducing apparatus.

However, in the prior construction, even if the supporting plate is tilted to any position, the apparatus may be damaged. Because the control panel is easily detachable and may, for example, be removed from the supporting plate in the middle of the ejecting operation of a CD, a cassette tape or the like, the CD or the cassette tape being in ejecting operation runs into this control panel, so that either of them may be damaged.

Furthermore, since the supporting plate is constructed with a metallic plate, if the control panel is removed from this supporting plate when the supporting plate is in a tilted condition, the metallic plate of the supporting plate protrudes forwardly, and hence, there is a possibility that an accident may occur. For example, the driver may be injured if his fingers touch the supporting plate.

Still further, the operation of pressing an eject switch for ejecting a record medium from the reproducing apparatus body is troublesome, and the installation of the eject switch increases the manufacturing cost accordingly.

Moreover, such vehicle-mounted record medium reproducing apparatus may require a start key to be used to operate the personal computer function, a Mayday key to receive information on the occurrence of an emergency situation on a security system, and others. The key configurations of these types of keys must have excellent operational performance.

SUMMARY OF THE INVENTION

Accordingly, the present invention has been developed in order to eliminate the above-mentioned problems. It is therefore an object of this invention to provide a vehicle-mounted record medium reproducing apparatus which does not require the installation of a motor for tilting a control panel in the interior of the reproducing apparatus body and the installation of an eject switch, and in which the key configurations of various types of keys are superior in operational performance and a control panel is safely removable from a supporting plate, and further, which ensures safe and certain insertion and removal of a record medium.

For this purpose, according to a first aspect of this invention, there is provided a vehicle-mounted record medium reproducing apparatus with a personal computer function comprising a control panel tiltable manually through a tilting link mechanism and placed in a front surface of a reproducing apparatus body to cover a record medium insertion opening of the reproducing apparatus body.

This invention is premised on a record medium reproducing apparatus which allows various kinds of system operations, for example, car audio, navigation, personal computers, security and radiocommunication, based upon an operating system such as "Windows CE" (produced by MicroSoft Co., Ltd.).

In this reproducing apparatus, there is no room to install a motor for tilting a control panel in the interior of the reproducing apparatus body because the number of parts such as electrical devices is substantially increased. Thus, a mechanism for manually tilting the control panel is employed to eliminate the need for the motor.

According to a second aspect of this invention, there is provided a vehicle-mounted record medium reproducing apparatus with a personal computer function comprising a control panel tiltable manually through a tilting link mechanism and placed in a front surface of a reproducing apparatus body to cover a record medium insertion opening of the reproducing apparatus body, with a record medium being automatically ejected from the reproducing apparatus body when the control panel is tilted to the deepest tilting position.

In the case of employing a mechanism for manually tilting the control panel, an operation of pressing an eject switch to eject a record medium from the reproducing apparatus body after manually tilting the control panel is troublesome. Thus, the record medium is made to be automatically ejected from the reproducing apparatus body when the control panel is manually tilted to the deepest tilting position. This improves the operational performance, and eliminates the need for the eject switch, so that the manufacturing cost is reducible.

According to a third aspect of this invention, there is provided a vehicle-mounted record medium reproducing apparatus with a personal computer function in which a start key for operating the personal computer function is placed on a control panel in a front surface of a reproducing apparatus body, and the start key is composed of a fixed section and an input section positioned to be recessed from the fixed section.

According to this invention, without confirming the key position by, for example, viewing the key operation, after the key position is first confirmed by the movement of a finger, a depression of the input section is feasible in a manner that the finger is moved to the vicinity of the fixed section, so that the key operation is possible by a blind touch without causing an input error or the like.

According to a fourth aspect of this invention, there is provided a vehicle-mounted record medium reproducing apparatus with a personal computer function in which a Mayday key for issuing information on the occurrence of an emergency situation is placed on a control panel in a front surface of a reproducing apparatus body, and the Mayday key is located at a recess position of a body case of the control panel.

A system using this Mayday key is a security system for the protection of a motor vehicle or the like. In this invention, since the Mayday key is placed at a recess position of the body case of the control panel, the Mayday key is not pressed in error, which prevents malfunction of the security system.

According to a fifth aspect of this invention, there is provided a vehicle-mounted record medium reproducing apparatus with a personal computer function in which an insertion section for a compact flash card is provided in the vicinity of a control panel in a front surface of a reproducing apparatus body.

According to a sixth aspect of this invention, there is provided a vehicle-mounted record medium reproducing apparatus with a personal computer function comprising a control panel tiltable in a front surface of a reproducing apparatus body to cover a record medium insertion opening of the reproducing apparatus body, with an insertion section for a compact flash card being provided in the vicinity of the control panel.

According to a seventh aspect of this invention, there is provided a vehicle-mounted record medium reproducing apparatus with a personal computer function comprising a horizontally elongated control panel tiltable in a front surface of a reproducing apparatus body to cover a record medium insertion opening of the reproducing apparatus body, with an insertion section for a compact flash card being provided in a vertically elongated space in the front surface of the reproducing apparatus body adjacent to the horizontally elongated control panel.

According to an eighth aspect of this invention, there is provided a vehicle-mounted record medium reproducing apparatus with a personal computer function comprising a control panel tiltable in a front surface of a reproducing apparatus body to cover a record medium insertion opening of the reproducing apparatus body, with an insertion section for a compact flash card being provided in the vicinity of the insertion opening.

This reproducing apparatus uses a compact flash card such as a memory card, a pager receive card, and other cards. In the case of using the compact flash card, when being mounted on a motor vehicle, good operational performance, vibration resistance and other features are required.

When taking the operational performance into consideration, since there is a limit in the range the driver operates in a motor vehicle, the compact flash card insertion section is located in the vicinity of the control panel in the front surface of the reproducing apparatus body.

According to a ninth aspect of this invention, in addition to any one of the abovementioned fifth to eighth aspects, a holding member for holding the inserted compact flash card is provided in the interior of the insertion section.

According to this invention, taking vibrations of a motor vehicle into consideration, the holding member is installed within the insertion section in order to hold the compact flash card. This enhances the card holding force, thereby providing excellent vibration resistance.

According to a tenth aspect of this invention, a control panel tiltable manually through a tilting link mechanism is provided in a front surface of a reproducing apparatus body to cover a record medium insertion opening, and a click sensation mechanism is provided to provide a click sensation when the control panel is tilted to a record medium ejecting position.

According to the tenth aspect of this invention, because of employing a mechanism for manually tilting the control panel, it is possible to eliminate the need for a motor for tilting the control panel.

In addition, since the click sensation is obtainable when the control panel is tilted to the record medium ejecting position, the record medium ejecting position is confirmable by a touch, and if the record medium ejecting position is confirmed and the record medium is inserted or ejected, the insertion and ejection occur safely and with certainty.

According to an eleventh aspect of this invention, a control panel tiltable manually through a tilting link mechanism is provided in a front surface of a reproducing apparatus body to cover a record medium insertion opening, and a record medium eject switch is provided which appears to be pressable when the control panel is tilted to a record medium ejecting position.

According to this invention, since the record medium eject switch appears to be pressable when the control panel is tilted to the record medium ejecting position, it is possible to prevent the record medium eject switch from being pressed in the middle of the tilting of the control panel.

According to a twelfth aspect of this invention, in addition to the eleventh aspect, a detection sensor is provided which detects the fact that the control panel is tilted to the record medium ejecting position, and the record medium is ejected when this detection sensor detects the record medium ejecting position and the aforesaid record medium eject switch is pressed.

According to this invention, when the detection sensor does not detect the record medium ejecting position, even if the record medium eject switch is pressed, the ejection of the record medium does not take place, which improves the safety in the insertion/ejection of the record medium.

According to a thirteenth aspect of this invention, a control panel tiltable manually through a tilting link mechanism is provided in a front surface of a reproducing apparatus body to cover a record medium insertion opening, and a click sensation mechanism is provided to produce a click sensation when the control panel is tilted to a record medium ejecting position, and a record medium eject switch is provided which appears to be pressable when the control panel is tilted to a record medium ejecting position, and further, a detection sensor is provided which detects the fact that the control panel is tilted to the record medium ejecting position, with the record medium being ejected when this detection sensor detecting the record medium ejecting position and the record medium eject switch is pressed.

According to a fourteenth aspect of this invention, there is provided a vehicle-mounted record medium reproducing apparatus in which a supporting plate is provided to be tiltable to cover a record medium insertion opening in a front surface of a reproducing apparatus body and a control panel is detachably fitted through a connecting member to the supporting plate, wherein the connecting member is released from the connection only when the supporting plate is moved to a connection release enabling position.

According to a fifteenth aspect of this invention, in addition to the fourteenth aspect, the connecting member is made up of a claw member placed on the supporting plate to detachably engage with the control panel and a release lever for biasing the claw member provided on the reproducing apparatus body in a detaching direction, with the release lever biasing the claw member in the detaching direction only when the supporting plate is moved to the connection release enabling position and a claw member release key on the control panel is pressed.

According to a sixteenth aspect of this invention, in addition to the fifteenth aspect, the claw release key is equipped with a rod whereby the release lever is pressable.

According to a seventeenth aspect of this invention, in addition to the fourteenth aspect to the sixteenth aspect, the connection release enabling position is a position at which the control panel stands up.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENT

An embodiment of the present invention will be described hereinbelow with reference to the drawings.

Figure 1:
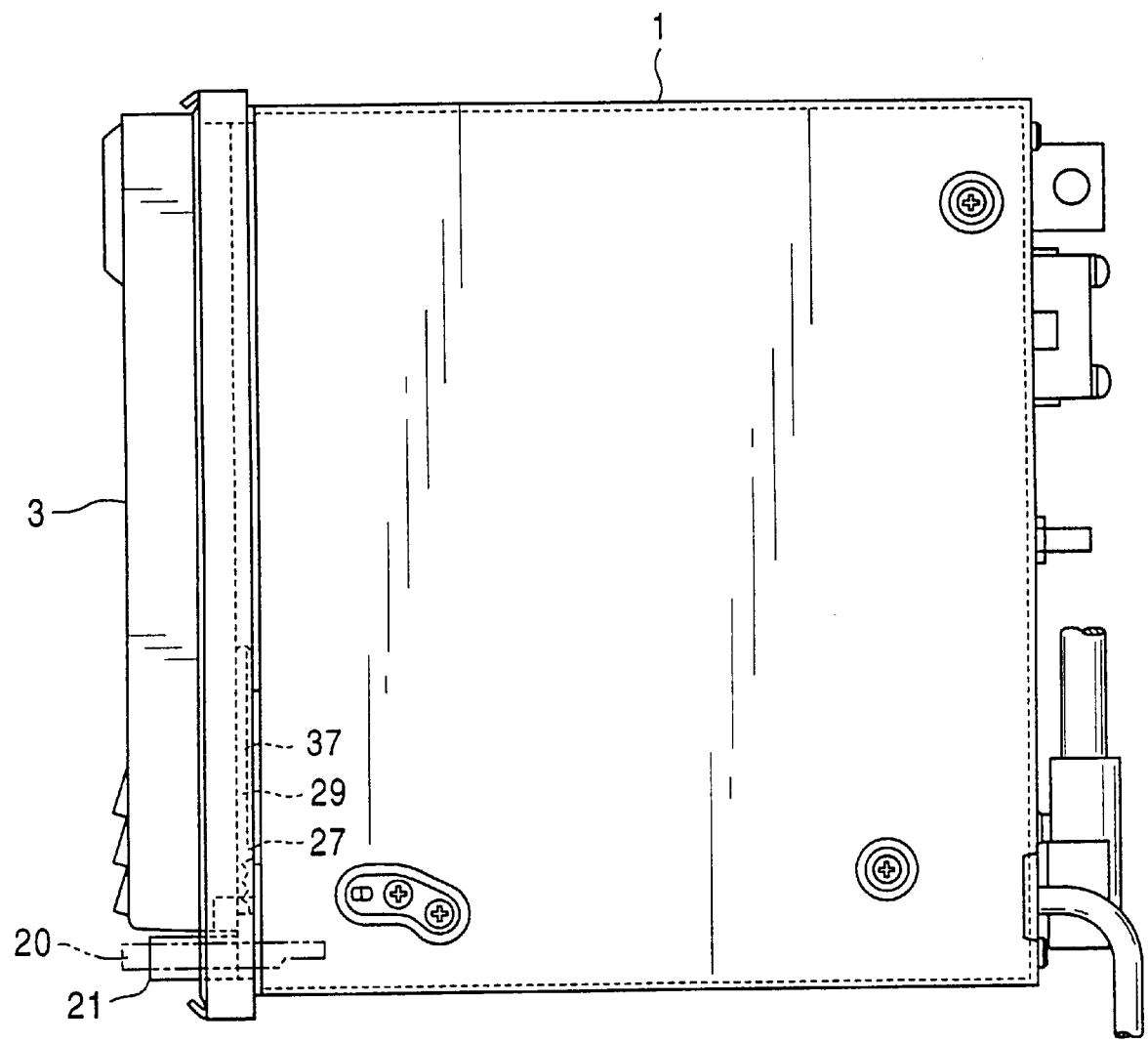
FIG. 1 is a plan view showing an embodiment of a vehicle-mounted record medium reproducing apparatus according to the present invention.
Figure 2:
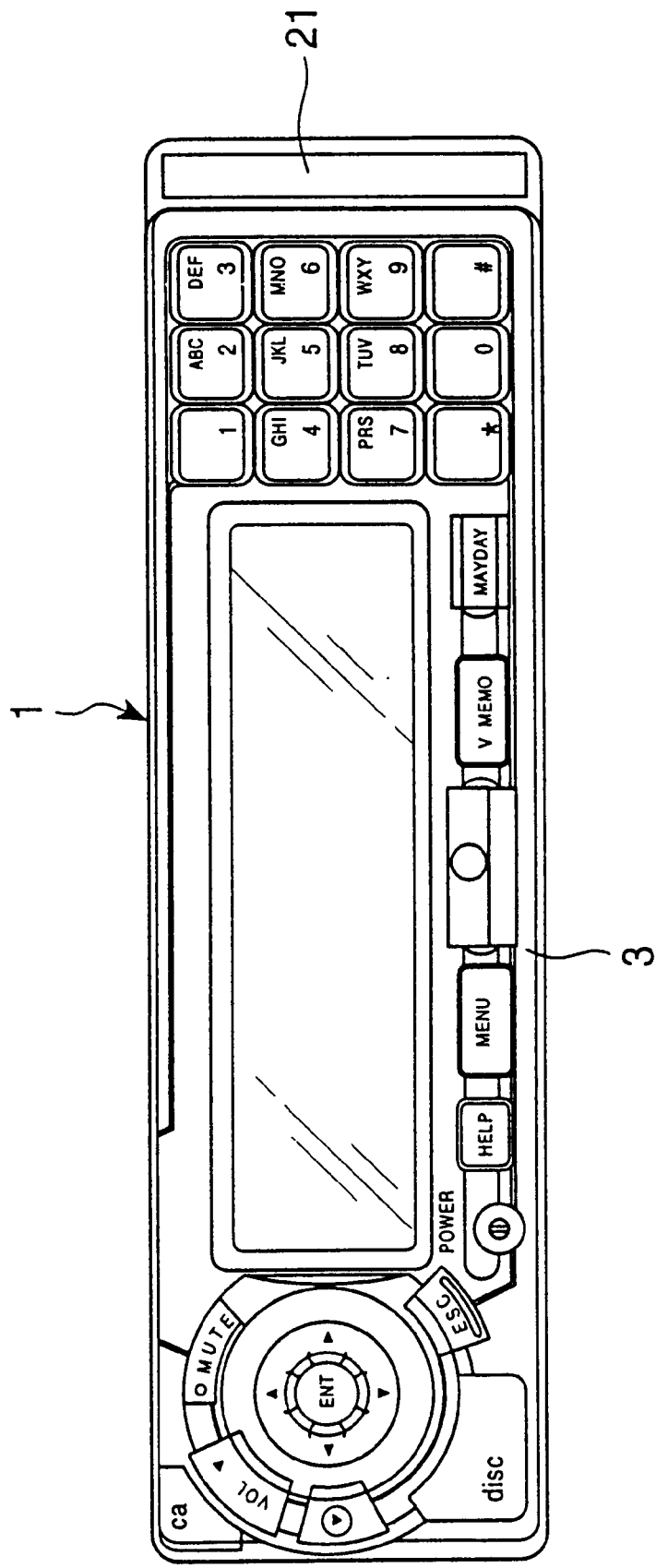
FIG. 2 is a front elevational view showing the same vehicle-mounted record medium reproducing apparatus.
Figure 3:
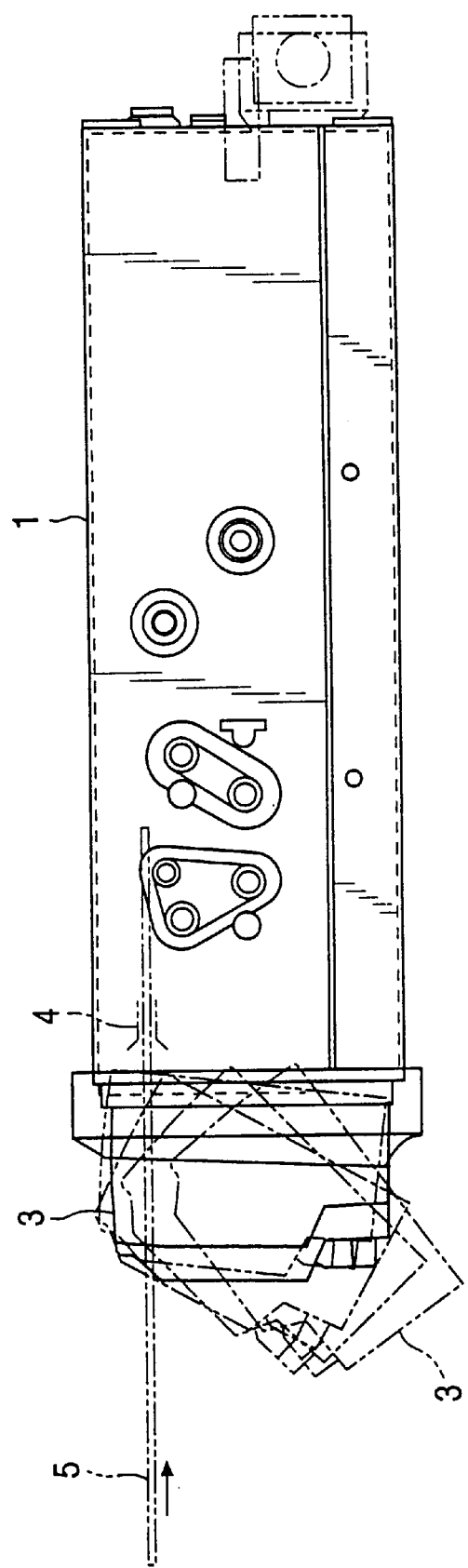
FIG. 3 is a side elevational view showing the same vehicle-mounted record medium reproducing apparatus.

In FIGS. 1 to 3, reference numeral 1 represents a reproducing apparatus body (which will be referred to hereinafter as a CD player) of a vehicle-mounted record medium reproducing apparatus having a personal computer function. In a front surface of this CD player 1, a detachable control panel (which will be referred hereinafter to as a DCP) 3 is provided. This DCP 3 is, as indicated by a virtual line in FIG. 3, made to be tiltable manually to cover a record medium insertion opening 4 of the CD player 1. Into this CD player 1, a compact disk (which will be referred hereinafter to as a CD) 5 is inserted through the record medium insertion opening 4 in a state where the DCP 3 is in a tilted condition, whereupon music or the like recorded on the CD is reproducible.

Figure 5:
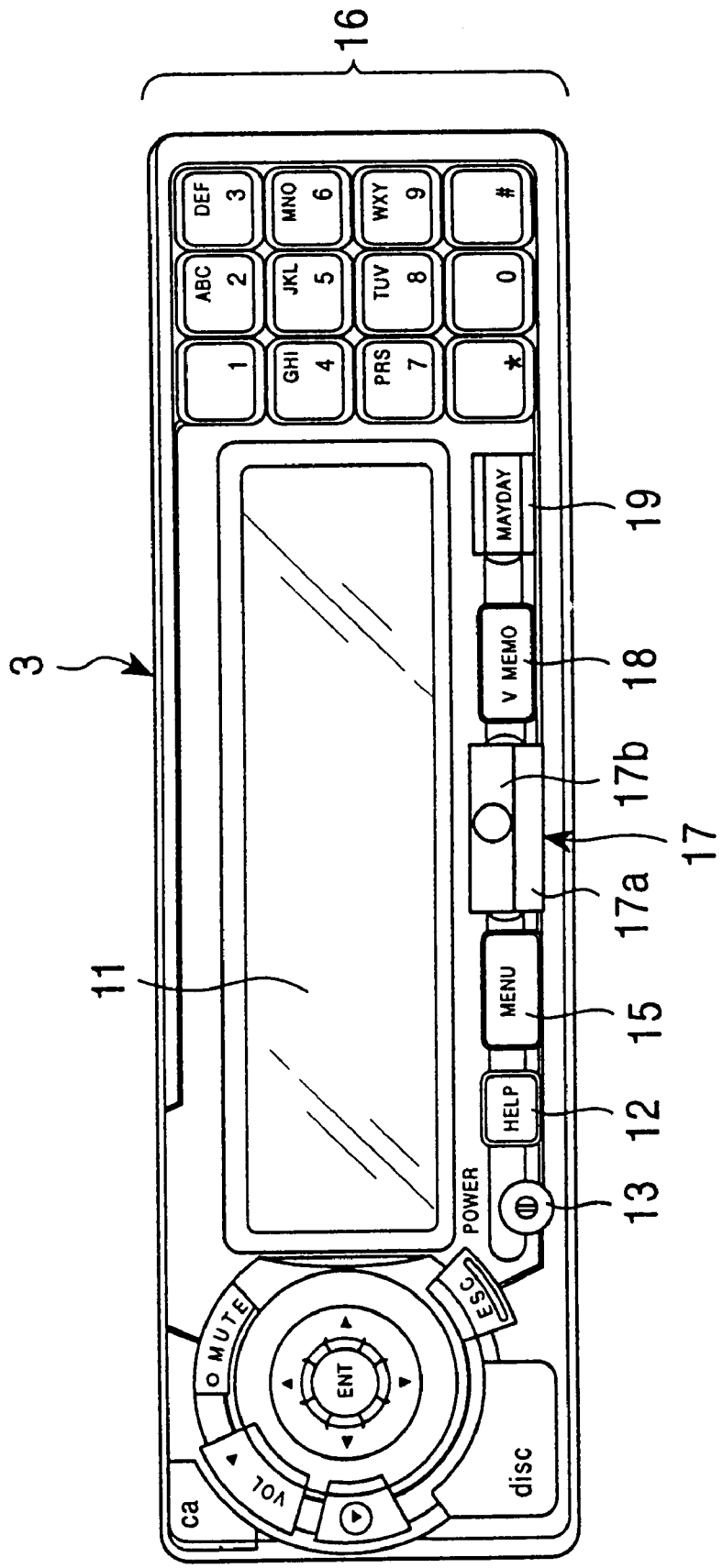
FIG. 5 is a front elevational view showing the control panel.

As shown in FIG. 5, the DCP 5 is provided with, in addition to a liquid crystal display section 11 and a power key 12, various types of keys such as an enter key 13, a help key 15, a start key 17, a memo key 18, a Mayday key 19 and a data input key 16 for a personal computer.

The CD player 1 stores a general-purpose operating system ("OS") such as "Windows CE" (produced by Microsoft Co., Ltd.), and this CD player 1 is designed to accomplish various kinds of system operations such as car audio, navigation, personal computer, security and radiocommunication, based upon the aforesaid operating system.

Figure 6:
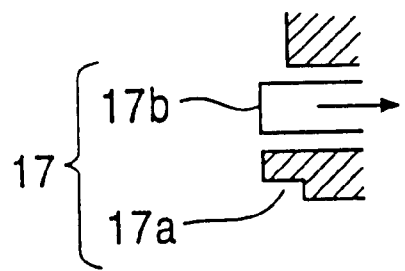
FIG. 6 is a cross-sectional view showing a start key on the control panel.

The aforesaid operating system starts in response to the depression of the start key 17 of the DCP 3. This start key 17 is, as shown in FIG. 6, composed of a fixed section 17a and an input section 17b positioned so as to be recessed from the fixed section 17a. Accordingly, if the key position is not confirmed by, for example, viewing the key operation, after the key position is confirmed in a manner that a finger is shifted to the fixed section 17a, it is possible to carry out the depression of the input section 17b by moving the finger to right under the fixed section 17a. Thus, an error input due to a blind touch is preventable.

After the aforesaid operating system starts, the various system operations become possible through the operation of the various keys.

When the Mayday key 19 of the DCP 3 is pressed, the power supply automatically starts irrespective of the power key 12 of the CD player 1 being not turned on, and the system transmits information indicative of the occurrence of an emergency situation through radiocommunication toward, for example, a rescue member. This system is a security system for the purpose of the protection of a motor vehicle or the like.

Figure 7:
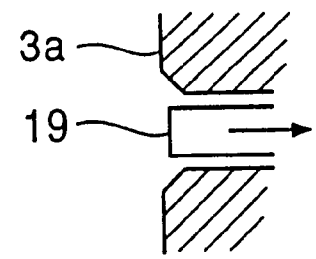
FIG. 7 is a cross-sectional view showing a Mayday key on the control panel.

Thus, as shown in FIG. 7, a body case 3a of the DCP 3 is recessed, and the Mayday key 19 is placed in this recess position to prevent erroneous pressing thereof The CD player 1 to which a personal computer function is added, uses, for example, a memory card, a pager receive card, a compact flash card and other cards. In the case of using this compact flash card, of being mounted on a motor vehicle, the apparatus is required to have operational performance, vibration resistance and other properties.

In this embodiment, as shown in FIG. 1, the DCP 3 horizontally elongated is provided in a front surface of the CD player 1, and an insertion section 21 for a compact flash card 20 is made in a vertically elongated space in the front surface of the aforesaid CD player 1, adjacent to the DCP 3. This insertion section 21 is desirably provided in the vicinity of the DCP 3 in view of operational performance. For instance, the insertion section 21 ca also be provided in the interior of the CD player 1 which appears in front of the driver when the DCP 3 is tilted, that is, near the record medium insertion opening 4.

In this event, in the case of using a pager receive card, there remains a problem in the processing of an antenna (not shown) connected to the pager receive card. This is because difficulty is experienced in leading out the antenna, connected to the pager receive card, to the exterior of the CD player 1 when the DCP 3 rises.

In this embodiment, since the insertion section 21 is provided adjacently to the DCP 3, when the pager receive card is inserted into the insertion section 21, an antenna (not shown) connected to the pager receive card can easily be led out to the exterior.

Furthermore, in general, the CD player 1 is placed in an extremely limited space such as a dashboard or console box in a motor vehicle.

Accordingly, the area allowable as an operating plane of the CD player 1 is extremely limited. In this embodiment, the DCP 3 horizontally elongated is first provided in the front surface of the CD player 1, and then, the insertion section 21 is provided in a vertically elongated space adjacent to the horizontally elongated DCP 3, and therefore, both the DCP 3 and insertion section 21 are compactly accommodated in the operating plane with an extremely high efficiency. Accordingly, it is possible to improve the operational performance for the driver of the motor vehicle.

Figure 8:
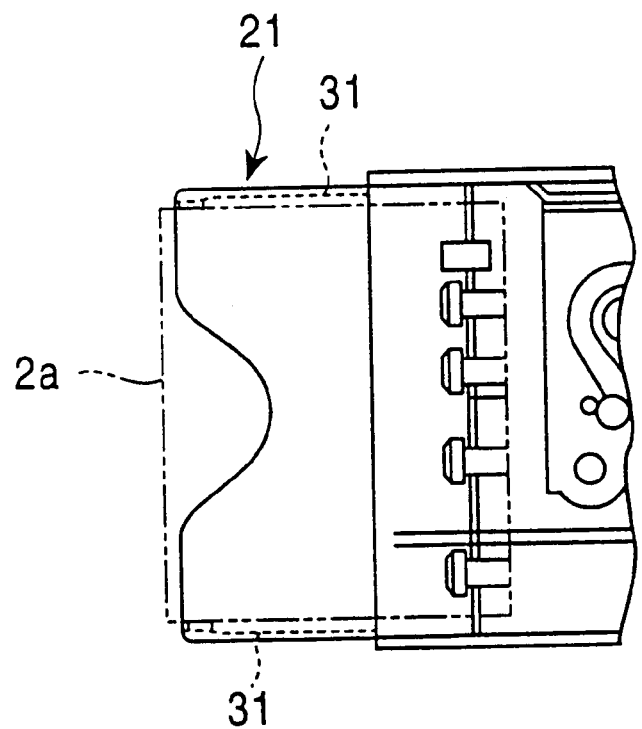
FIG. 8 is an illustration of a holding member in an insertion section in the same vehicle-mounted record medium reproducing apparatus.

In the interior of the insertion section 21, plate springs 31 are placed on the upper and lower sides as shown in FIG. 8. These plate springs 31 constitute a holding member for holding the inserted compact flash card 20 from the upper and lower sides, and are for offering a card supporting construction bearing the vibrations of a motor vehicle. In addition, the plate springs 31 are preferably coupled to the ground. It serves as a ground when the pager receive card is inserted therein.

Secondly, a description will be made hereinbelow of a tilting mechanism of the DCP 3.

Figure 9A:
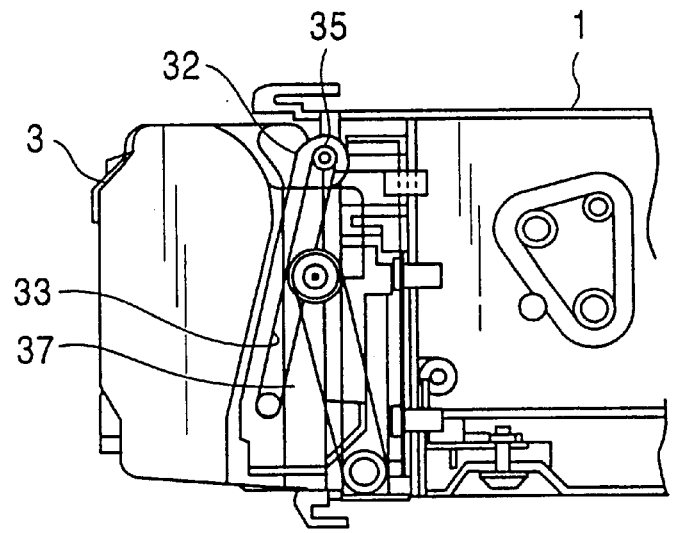
FIGS. 9A and 9B are illustrations of a supporting construction for the control panel.

As shown in FIG. 9A, a pair of brackets 32 are fixedly secured to both end portions of the front surface of the CD player 1. The brackets 32 have an elongated hole 33, and a roller 35 is loosely fitted in the elongated hole 33, and further, is connected to a supporting plate 37 of the DCP 3.

Figure 10A:
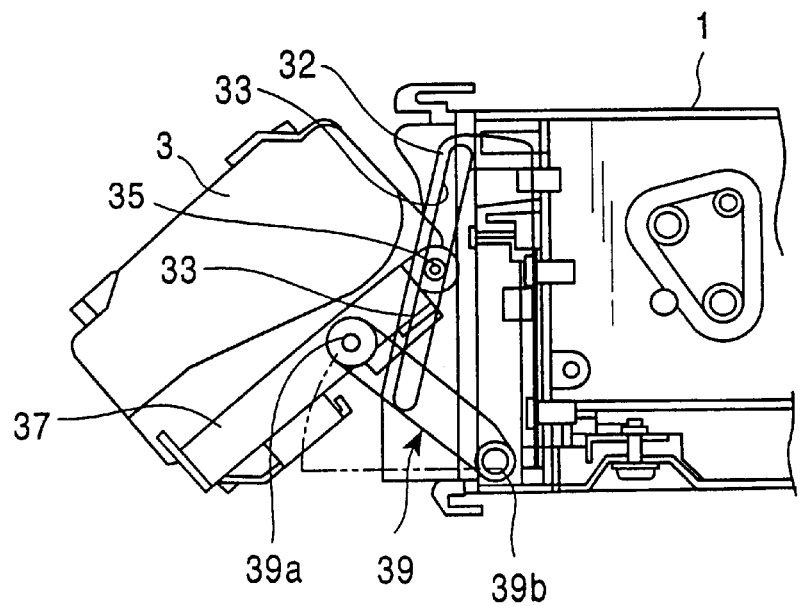
FIGS. 10A and 10B are illustrations of the supporting construction for the control panel.
Figure 11A:
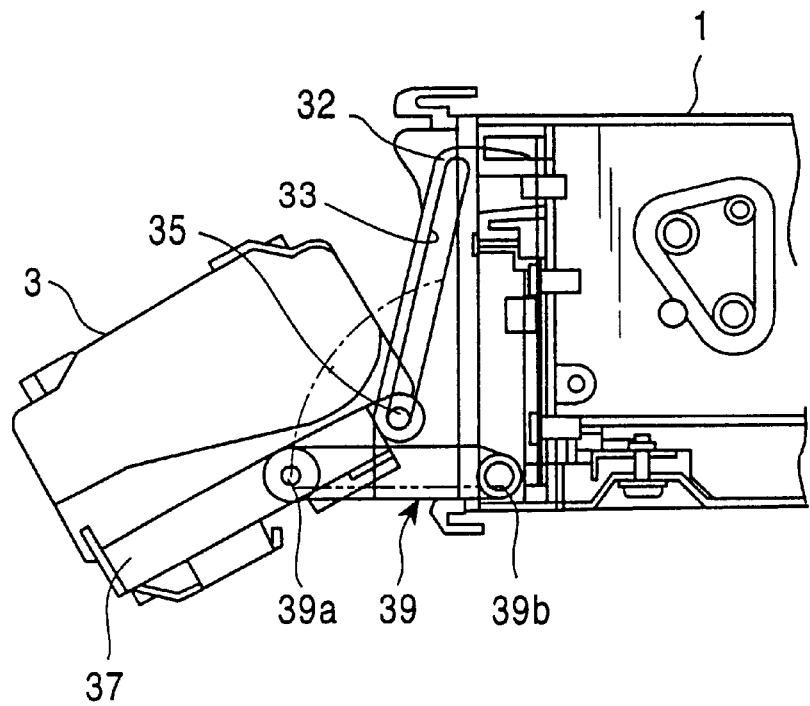
FIGS. 11A and 11B are illustrations of the supporting construction for the control panel.

As shown in FIGS. 10A and 11A, this supporting plate 37 is manually tiltable to an arbitrary position, and the DCP 3 is fixedly secured to the supporting plate 37. Numeral 39 designates a link lever, and its one end portion 39a is connected to the supporting plate 37, while the other end portion 39b is connected to a fixed section of the CD player 1. A structure for tilting the DCP 3 constitutes a tilting link mechanism.

Figure 9B:
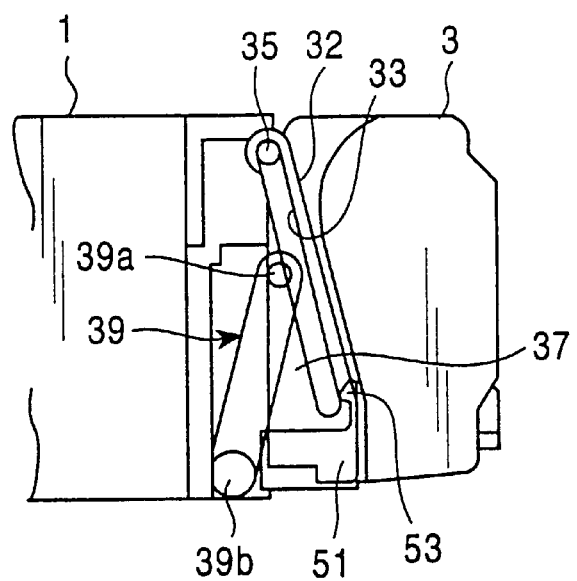

Furthermore, as shown in FIG. 9B, a resin-made block 51 is fixed to a lower end portion of the bracket 32, and a hook 53 is formed at the tip portion of the block 51. This hook 53 is pressed so as to be broadened in a direction of an arrow by the roller 35 when the DCP is tilted to the position in FIG. 10B, and, when the DCP 3 is tilted to the record medium ejecting position in FIG. 11B, runs over the roller 35 and is repulsively pressed to be returned in the arrow direction.

In this case, the operator that tilts the DCP 3 can obtain a click sensation. Accordingly, the hook 53 of the block 51 constitutes a click sensation mechanism.

Figure 10B:
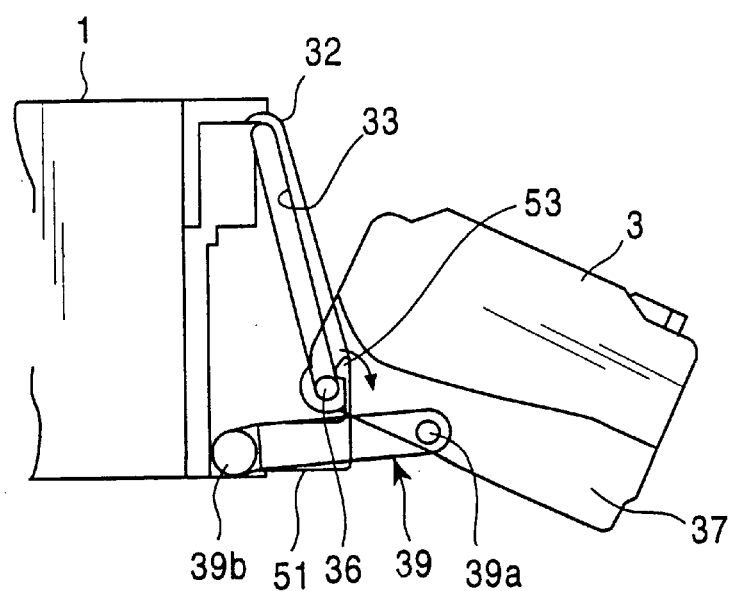
Figure 11B:
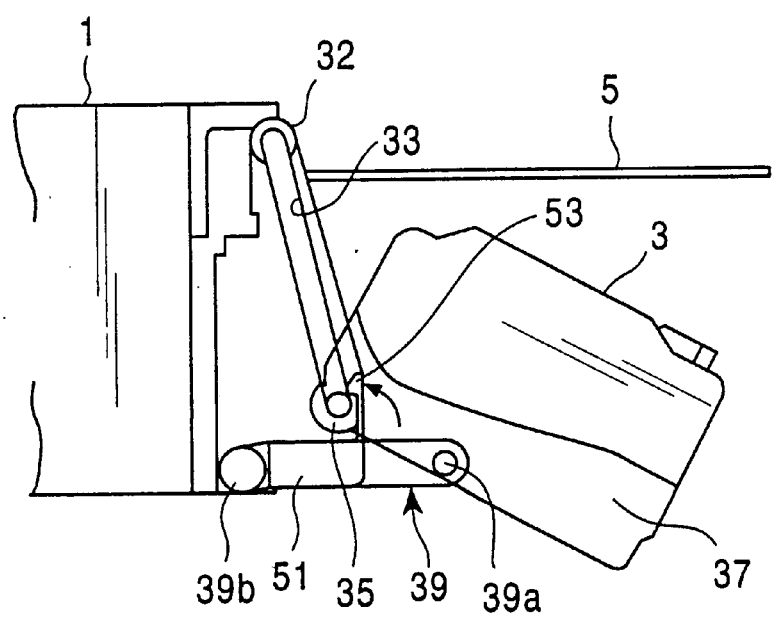

Incidentally, when being once engaged with the roller 35, this hook 53 of the block 51 acts as a resistance to the roller 35 afterwards, so that it is possible to prevent the DCP 3 from accidentally moving, for example, from the position in FIG. 11B to the position in FIG. 10B.

Although the DCP 3 is attached to the supporting plate 37, in general, this DCP 3 is made detachable. This is for the purpose of making the DCP 3 burglarproof when the driver leaves the motor vehicle, and the DCP 3 can be removed from the motor vehicle. The DCP has a claw portion, and inasmuch as the claw portion is engaged with an opening of the supporting plate 37, the DCP 3 can be attached to the supporting plate 37 by one touch operation.

The attachment or detachment of the DCP 3 is done in a state where the DCP 3 rises, as shown in FIG. 9A. If the DCP 3 is attached or detached in a state of being tilted as shown in FIGS. 10A and 11A, the supporting plate appears in front of the CD player 1 after the DCP 3 is detached, and when a finger or the like of the driver comes into contact with the supporting plate 37, there is a possibility that the driver's finger may be injured.

In the case that the DCP 3 is detached at the position shown in FIG. 9A, the claw release key 25 (see FIG. 16) is pressed, whereupon the claw portion of the DCP 3 is released from engagement with the opening of the supporting plate 37 so that the DCP 3 is detachable from the supporting plate 37.

On the contrary, when being attached, the claw portion of the DCP 3 is engaged with the opening of the supporting plate 37. In this case, the insertion section 21 serves as a guide. More specifically, in a state where one end portion 3b of the DCP 3 is brought into contact with a wall portion 21a of the insertion section 21 and is guided thereby, the one end portion 3b is first pressed so that the claw portion 27 (see FIG. 1) on the one end portion 3b side is engaged with the opening 29 of the supporting 37, and then, the other end portion 3c of the DCP 3 is pressed so that the claw portion on the other end portion 3c side is engaged with the opening of the supporting plate 37. In other words, the DCP 3 is provided with the claw portion 27 engaging with the opening 29 of the supporting plate 37 which works when the end portion of the DCP 3 is brought into contact with the insertion section 21 and is pressed.

Thus, at the attachment of the DCP 3, because it is attached in a state of being guided by the wall portion 2 1a of the insertion section 21, the attachment of the DCP 3 becomes extremely easy.

Figure 15:
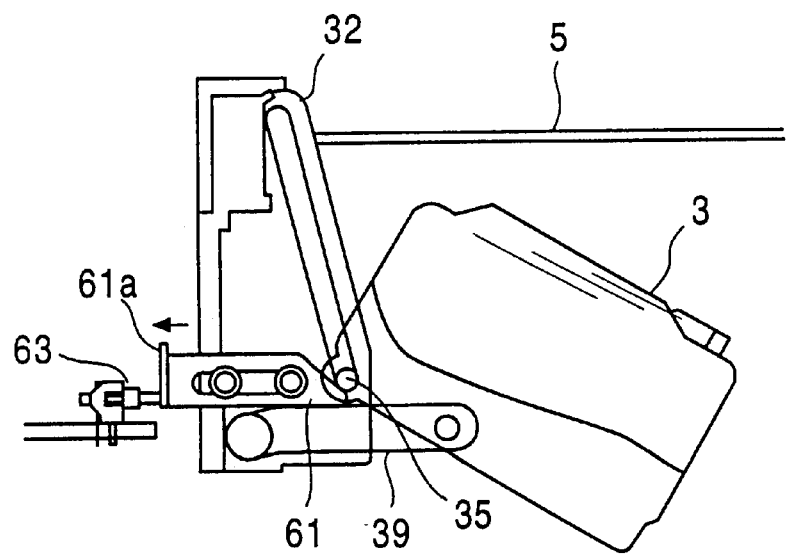
FIG. 15 is an illustration of a construction for detecting a record medium ejecting position in the control panel.

Furthermore, in this embodiment, in FIG. 15, the DCP 3 is tilted to the record medium ejecting position, and a metallic cam 61 is fitted to the record medium side, that is, a lower end portion of the bracket 32, and the cam 61 is biased in the right direction in the illustration by a spring (not shown). When the DCP 3 is tilted to the record medium ejecting position in FIG. 15, the cam 61 is pressed against the force of the spring in a direction indicated by an arrow by means of the roller 35. A limit switch 63 fitted to a main base plate 1a is placed in the rear of the cam 61, and when the cam 61 is pressed in the arrow direction, the limit switch 63 is operated by being pressed by a rear end portion 61a of the cam 61, so that the record medium ejecting position is detected by the output thereof. This limit switch 63 is fixed to the main base plate 1a, and hence, the electric wiring can be simplified. Incidentally, when the DCP 3 is tilted to reach the record medium ejecting position, the hook 53 of the block 51 provides a click sensation.

In this embodiment, even if the record medium eject switch 5 (see FIG. 4) is pressed, it is not until the limit switch 63 detects the fact that the DCP 3 reaches the record medium ejecting position, that the ejection of the CD 5 is carried out by a non-shown electric circuit. Further, in this embodiment, the limit switch 63 can be set at an arbitrary position by the variation of the stroke of the cam 61. Accordingly, it is possible to virtually eliminate the limitation in the location of the limit switch 63, and for instance, the limit switch 63 can be placed at a position remote from the operating mechanism of the supporting plate 37, and thus the degree of freedom of the design can improve.

Moreover, in this embodiment, since the mechanism for manually tilting the DCP 3 is employed, unlike the prior art, it is possible to eliminate the need for a motor for tilting the DCP 3.

Figure 4:
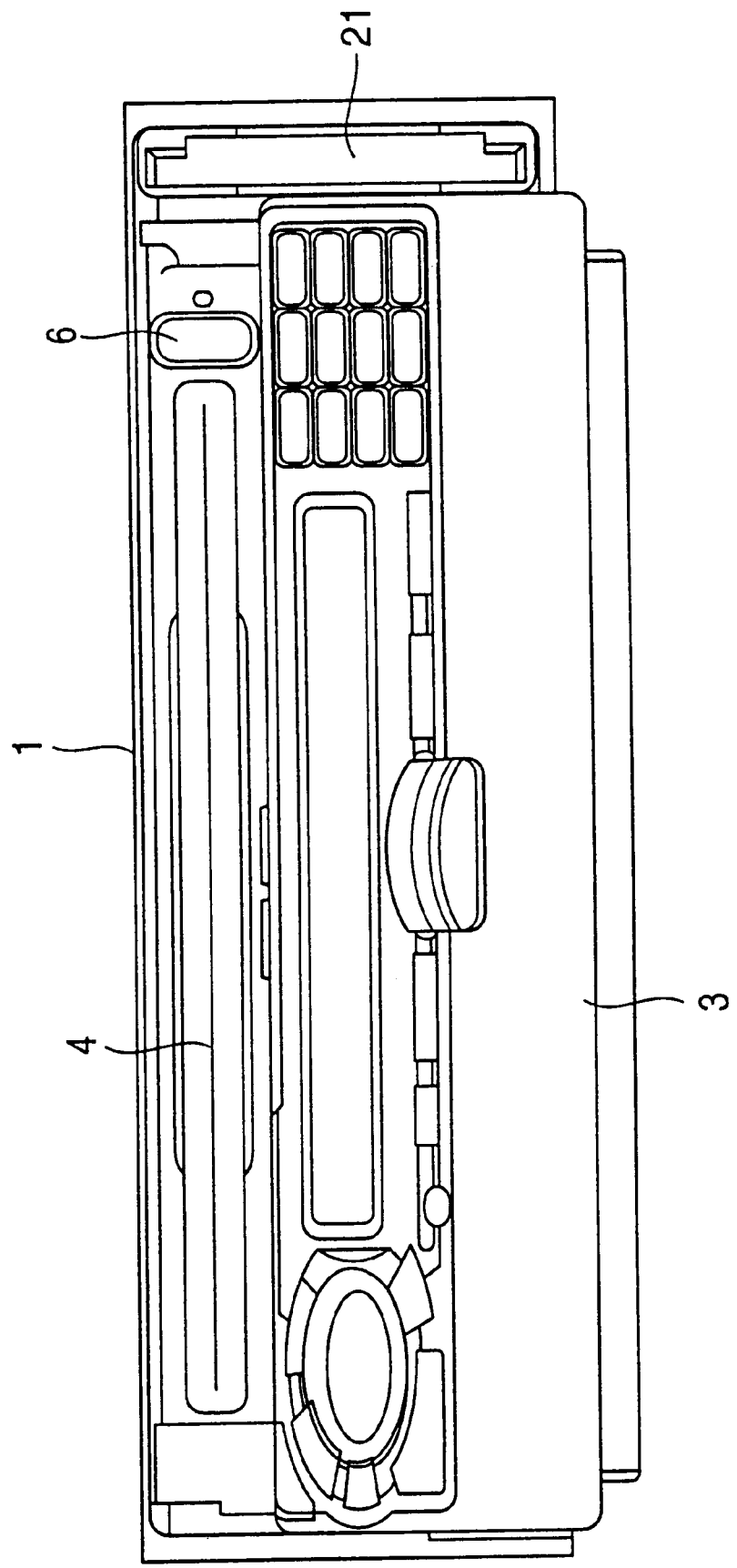
FIG. 4 is a front elevational view showing a state where a control panel is tilted in the same vehicle-mounted record medium reproducing apparatus.

Besides, when the DCP 3 is tilted to the record medium ejecting position, as shown in FIG. 11B, since a click sensation is obtainable through the hook 53 of the block 51, it is possible to confirm the record medium ejecting position by touching. Because the record medium ejecting position the DCP 3 assumes is accurately confirmable in this way, the limit switch 63 (see FIG. 15) for the position detection can be omitted. This also contributes to safe and certain insertion and ejection of the CD 5. In addition, in this embodiment, when the DCP 3 is tilted to the record medium ejecting position, since the record medium eject switch 6 appears in front of the CD player 1 as shown in FIG. 4, it is impossible to press the record medium eject switch 6 in the middle of the tilting of the DCP 3. Accordingly, this also contributes to safe and certain insertion and ejection of the CD 5.

Figure 12:
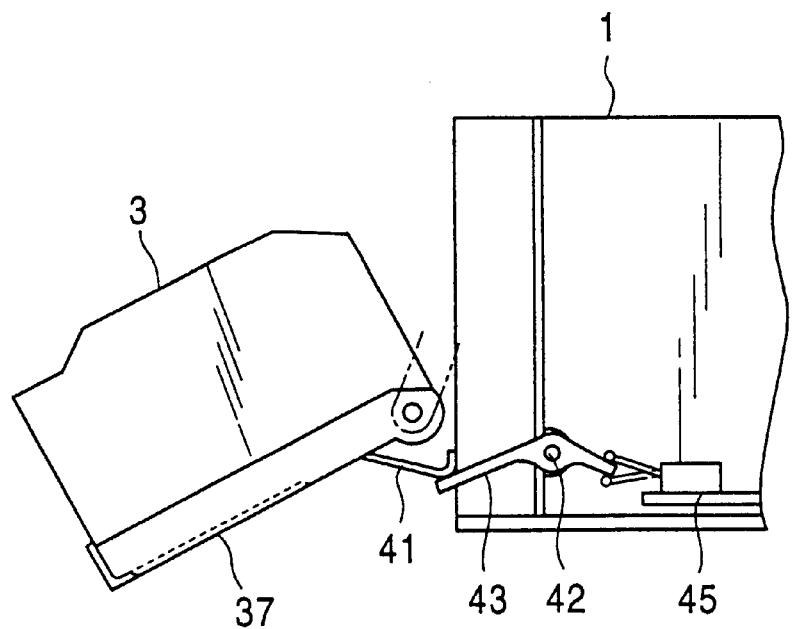
FIG. 12 is an illustration of a construction of an eject switch in the same vehicle-mounted record medium reproducing apparatus.
Figure 13:
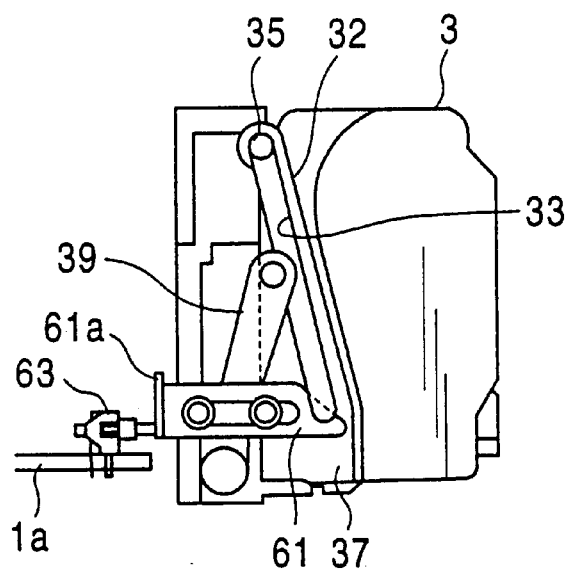
FIG. 13 is an illustration of a construction for detecting a record medium ejecting position in the control panel.
Figure 14:
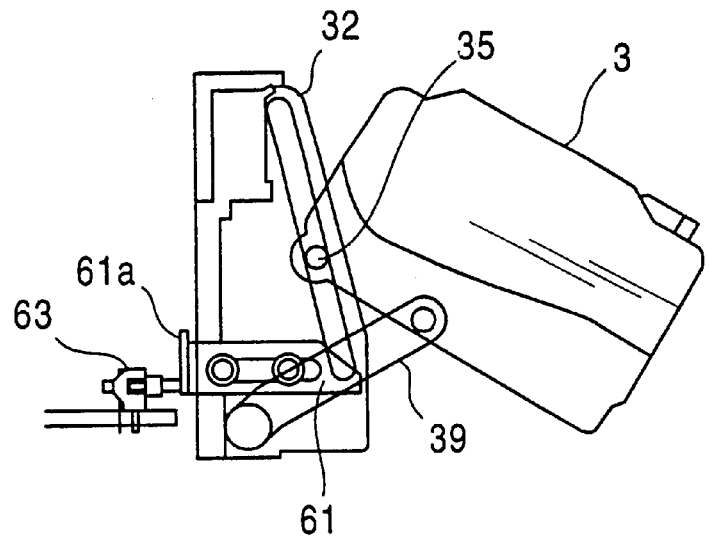
FIG. 14 is an illustration of a construction for detecting a record medium ejecting position in the control panel.

In another embodiment, when the DCP 3 is tilted to the tilted position shown in FIG. 11A and further pushed down to reach the deepest tilted position as shown in FIG. 12, a lever 41 of a supporting plate 37 rotates a dog 43 connected through a pin 42 to a fixed section of the CD player 1, and a limit switch 45 is put into operation through the dog 43 to drive an eject motor (not shown) for the CD 5.

Thus, in the case of employing a mechanism for manually tilting the DCP 3, there is no need to press the eject switch after the DCP 3 is manually tilted, which improves the operational performance and reduces the cost because the eject switch for the CD 5 is omissible.

Next, a description will be made hereinbelow of a construction for the connection between the DCP 3 and the supporting plate 37.

The DCP 3 and the supporting plate 37 are detachably connected through a connecting member to each other. This is for allowing the DCP 3 to be taken out from a motor vehicle for the burglarproof of the DCP 3 when the driver goes away from the motor vehicle. The aforesaid connecting member is placed on both end portions of the DCP 3 in its longitudinal direction. The connecting member on the on end portion side is, as shown in FIG. 1, made up of a claw portion 27 placed on the one end portion 3b of the DCP 3 and an opening 29 to be engaged with the claw portion 27. This opening 29 is made in the supporting plate 37.

Figure 16:
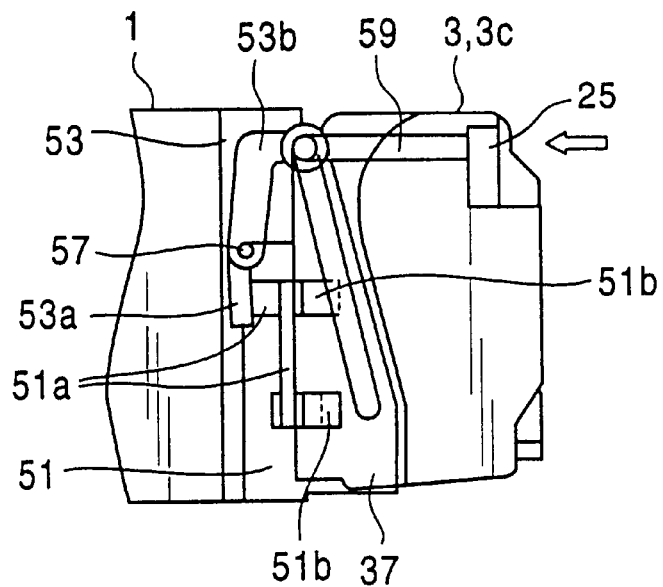
FIG. 16 is a side elevational view showing a connecting member in the same vehicle-mounted record medium reproducing apparatus.

The connecting member on the other end portion 3c side of the DCP 3 is, as shown in FIG. 16, composed of a release hook (claw member) 51 located on the supporting plate 3 7 and a release lever 53 placed on a fixed section of the CD player 1.

Figure 19:
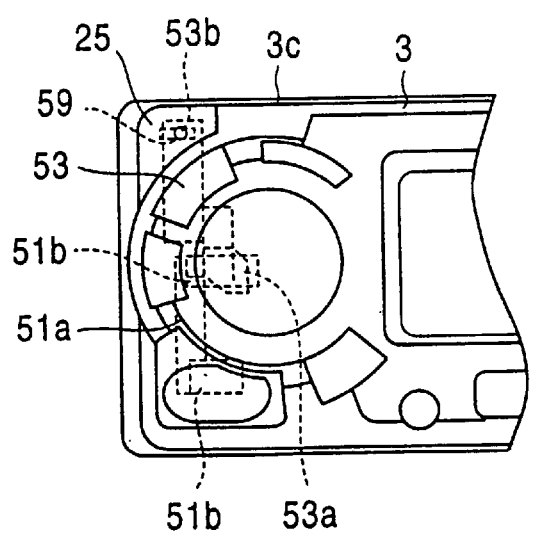
FIG. 19 is an illustration of the relationship between the control panel and the connecting member.
Figure 20:
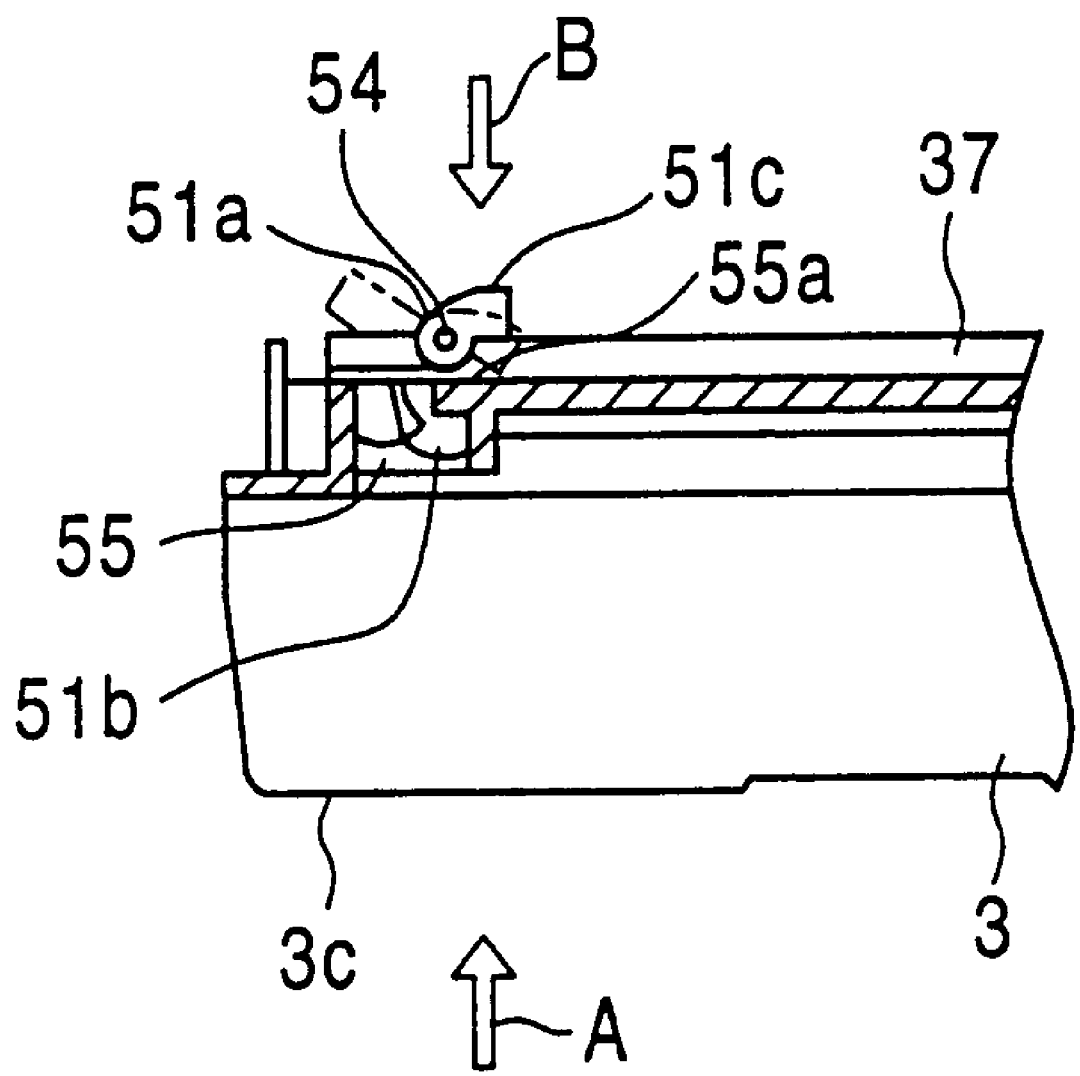
FIG. 20 is an illustration of the relationship between the control panel and the connecting member.

As shown in FIG. 19, the release hook 51 is equipped with a pair of hook portions 51b located at upper and lower sides of its hook body 51a, and the hook portions 51b are capable of engagement with the corresponding opening 55 (see FIG. 20) of the DCP 3. Further, as shown in FIG. 20, the release hook 51 is swingable around a pin 54 fixed to the supporting plate 37, and is biased by a spring (not shown) counterclockwise in the illustration at the normal time.

As shown in FIG. 16, the release lever 53 is swingable around a pin 57, and is normally biased by a spring (not shown) clockwise in the illustration. When being moved to a position (connection release enabling position) in FIG. 16 at which the supporting plate 37 rises, a lower end portion 53a of the release lever 53 comes into contact with the hook body 51a of the release hook 51, and an upper end portion 53b thereof protrudes to an upper portion of the CD player 1 to come into contact with a rod 59 connected to a claw release key 25 (see FIG. 4) of the DCP 3.

In this embodiment, in the case that the DCP 3 is mounted on the supporting plate 37, as shown in FIG. 1, in a state where the one end portion 3b of the DCP 3 is brought into contact with the wall portion 21 a of the insertion section 21 to be guided, the one end portion 3b is first pressed so that the claw portion 27 on the one end portion 3b side of the DCP 3 is engaged with the opening 29 of the supporting plate 37. Subsequently, as shown in FIG. 20, the other end portion 3c side of the DCP 3 is pressed in a direction indicated by an arrow A. When being pressed in the arrow A direction, an outer wall 55a of the opening 55 of the DCP 3 presses and retracts the hook portion 51b against a force of a spring (not shown) clockwise in the illustration, and at the time that the DCP 3 is pressed to a predetermined position, the hook portion 51b separates from the outer wall 55a, and the hook portion 51b is biased counterclockwise in the illustration by the force of the spring to be engaged with the opening 55.

On the other hand, in the case that the DCP 3 is detached from the supporting plate 37, first, the supporting plate 37 is brought to the rising position (connection release enabling position) shown in FIG. 15, and the claw release key 25 (see FIG. 4) of the DCP 3 is pressed.

Figure 17:
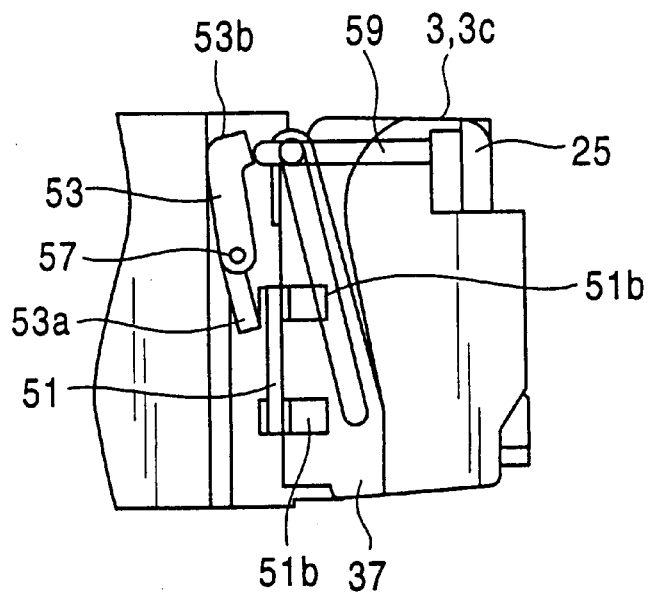
FIG. 17 is a side elevational view showing the connecting member.

Whereupon, as shown in FIG. 17, the rod 59 connected to the claw release key 25 is moved in the left direction in the illustration, and the upper end portion 53b of the release lever 53 is pressed so that the lower end portion 53a of the same release lever 53 is rotated clockwise in the illustration.

As shown in FIGS. 19 or 20, this lower end portion 53a presses a pressing piece 51c of the release hook 51 from a direction indicated by an arrow B, and the hook portion 51b of the release hook 51 is biased against the spring force clockwise in the illustration, whereupon the hook portion 51b on the other end portion 3c side of the DCP 3 is disengaged from the opening 55. In this case, simultaneously with the detachment of the hook portion 51b, the other end portion 3c side of the DCP 3 is pressed out by a spring (not shown) interposed between the supporting plate 37 and the DCP 3 to be considerably separated from the supporting plate 37. Accordingly, if this other end portion 3c side is held and separated, the engagement of the claw portion 27 on the one end portion 3b side is easily accomplished.

Figure 18:
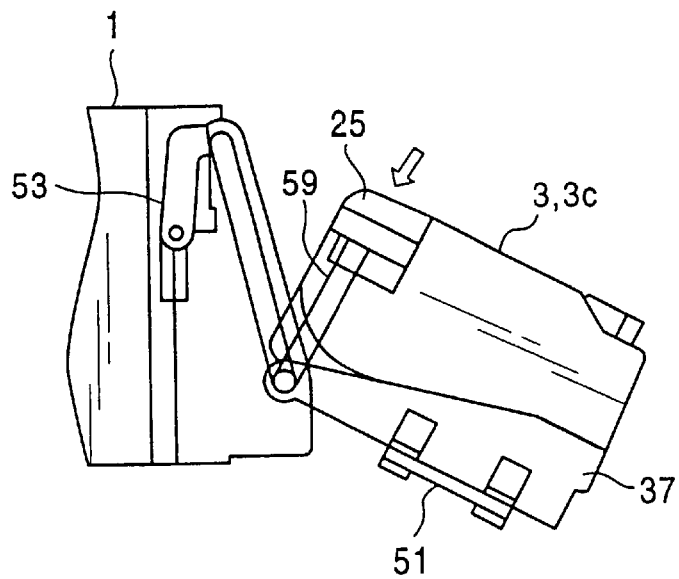
FIG. 18 is a side elevational view showing the connecting member.

In this embodiment, only when the supporting plate 37 is moved to the rising position (connection release enabling position) shown in FIG. 16 and the claw release key 25 (see FIG. 4) of the DCP 3 is pressed, the release hook 51 is biased in the detaching direction. For instance, as shown in FIG. 18, even if the claw release key 25 is pressed at the position where the supporting plate 37 is tilted, the rod 59 does not press and move the release lever 53. Accordingly, the release hook 51 is not biased in the detaching direction.

Thus, since the DCP 3 can not be detached at the position where the supporting plate 37 is tilted, for example, in the middle of the operation of ejecting the CD 5 or a cassette tape, the DCP 3 can not be detached from the supporting plate 37. Accordingly, since the CD 5 or the cassette tape does not run into the DCP 3 during the ejecting operation, the damage to the DCP 3, the CD 5, the cassette tape and others are preventable.

Furthermore, since the DCP 3 can not be detached from the supporting plate 37 in a state where the supporting plate 37 is tilted, only the metallic plate made supporting plate 37 does not protrude in front of passengers, thus improving safety.

Moreover, referring to the drawings, a description will be given hereinbelow of an embodiment of a construction for mounting a battery.

Figure 21:
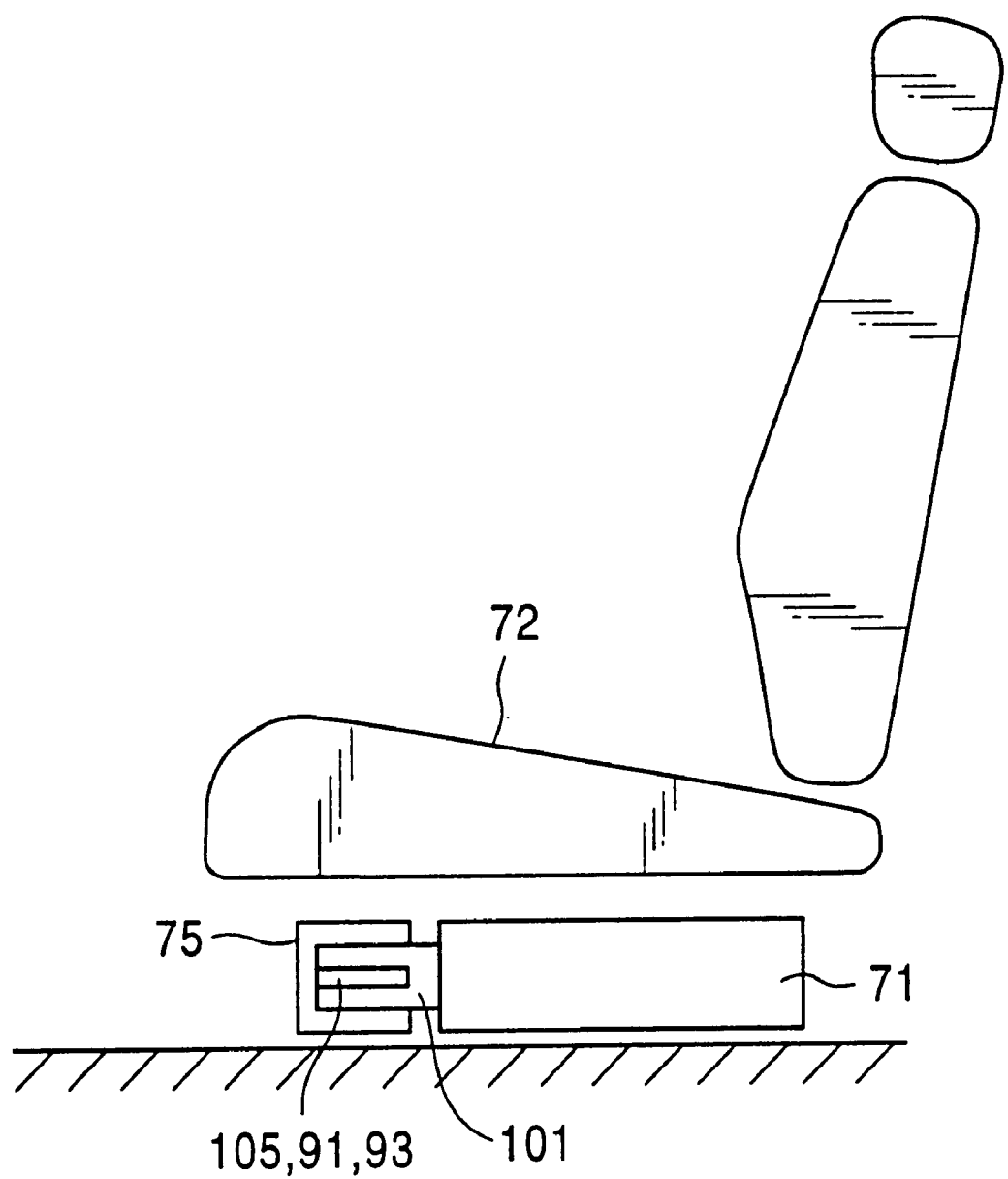
FIG. 21 is a front elevational view showing an embodiment of a battery mounting construction according to this invention.

In FIG. 21, numeral 71 denotes a black box tuner (which is a control unit; which will be referred hereinafter to as a tuner) installed under a seat 72 in a motor vehicle. This tuner 71 is connected to a record medium reproducing apparatus (for example, a CD player, not shown) located on a dashboard, a console box or the like in the motor vehicle. A power supply for this CD player is a main battery for the motor vehicle.

A sub-battery (which will be referred hereinafter as a battery) to be charged by the main battery is placed in a power supply path extending from the main battery. This battery is for temporarily increasing a supply power voltage to the CD player when the voltage of the main battery drops, for example, at the start of the engine.

Figure 22:
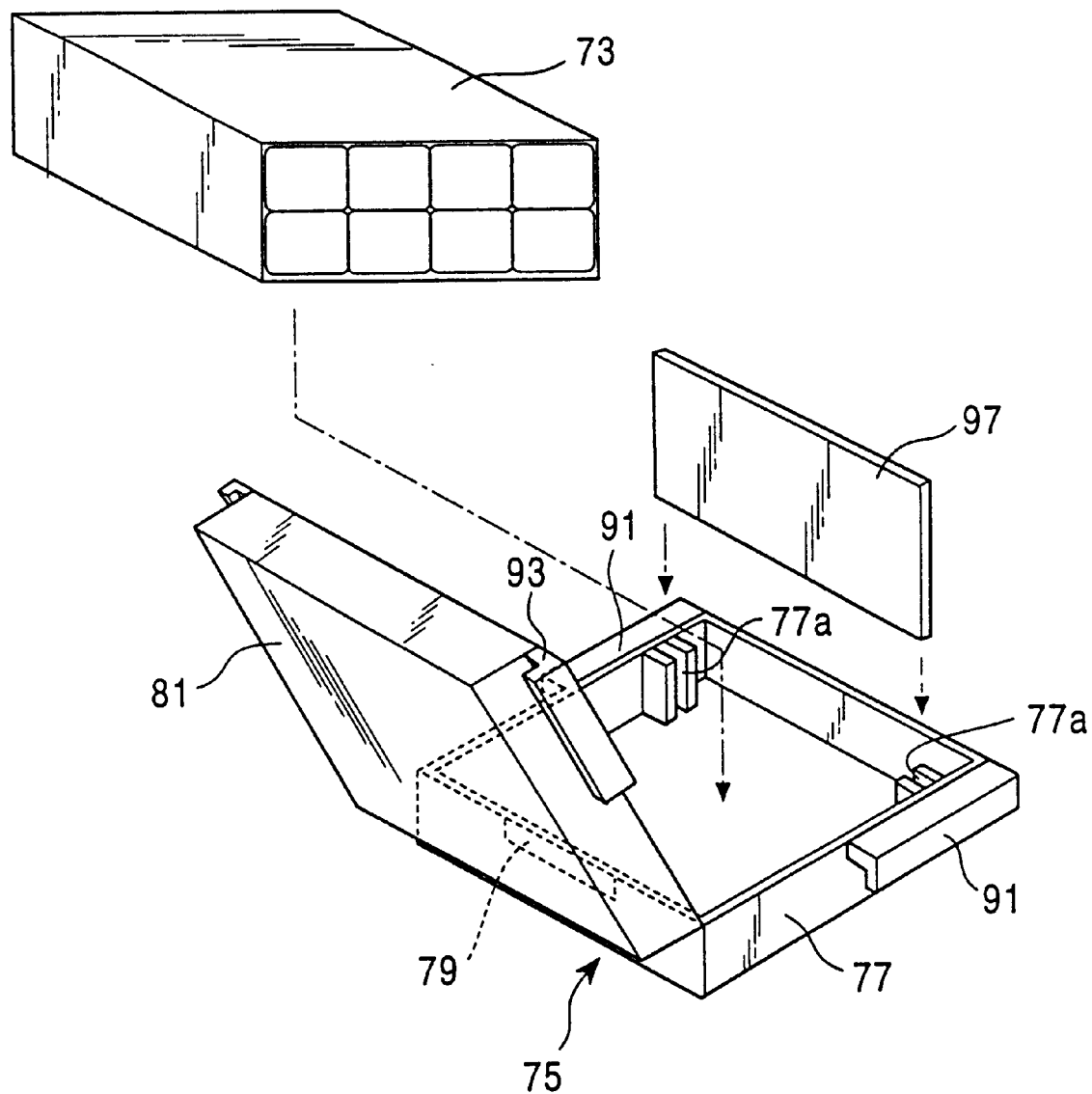
FIG. 22 is a perspective view showing a state where a battery case is in an open condition.

As shown in FIG. 22, the battery, designated at 73, is accommodated in a battery case 75. This battery case 75 is equipped with a case body 77 and a cover 81 openable and closable and connected through a hinge 79, made from a thin resin, to the case body 77, and protruding members 91, 93 are formed integrally on both end portions of the case body 77 and both end portions of the cover 81, respectively. Numeral 97 depicts a charging circuit substrate for the battery 73, which is put in a groove 77a of the case body 77 to be fitted therein.

Figure 23:
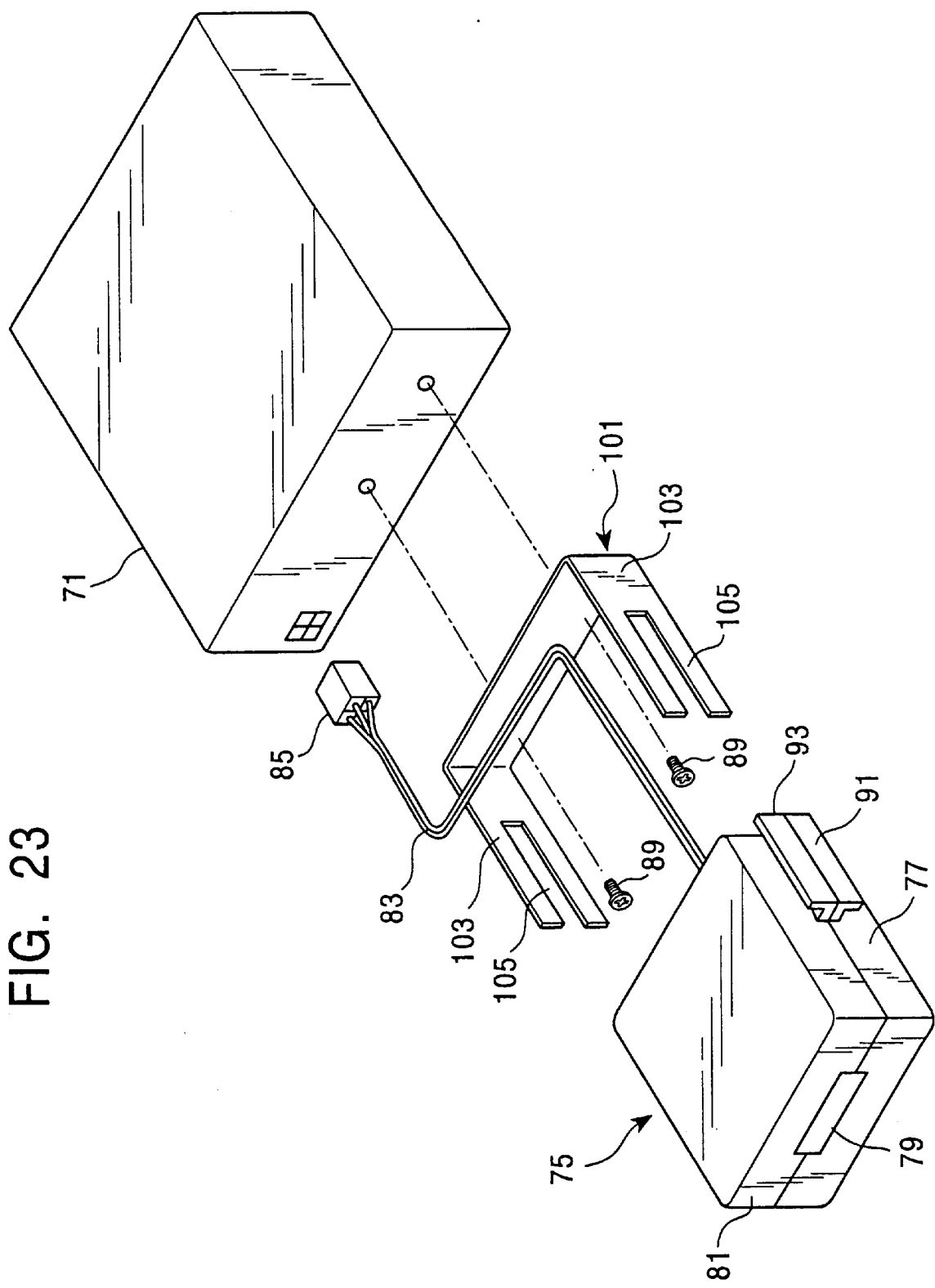
FIG. 23 is an exploded perspective view showing the battery mounting construction.

From the resin-made battery case 75, as shown in FIG. 23, a feeder line 83 extends, and is connected through a connector 85 to a control circuit (not shown) of the black box tuner 71.

A metallic plate made bracket 101 bent into a U-like configuration is fixedly fitted through screws 89 to the black box tuner 71, and each of both arms 103 of the bracket 101 has a groove 105 made to accommodate the aforesaid protruding members 91, 93.

Thus, the battery case 75 is fixed to the black box tuner 72 in a manner so that the protruding members 91, 93 are fitted in the grooves 105 of the bracket 101 fixed to the black box tuner 71. In this way, when the battery case 75 is fixed to the black box tuner 71, unlike the prior art, there is no need to use screws (that is, screwless), so that the battery 75 can easily be fixed.

Particularly, in cases where the black box tuner 71 is put under an assistant driver's seat 72 or the like (see FIG. 21), since the battery case 75 is attachable and detachable to and from the black box tuner 71 by one touch operation without using screws, it is possible to easily replace the battery 73 with a new one.

Figure 24C:
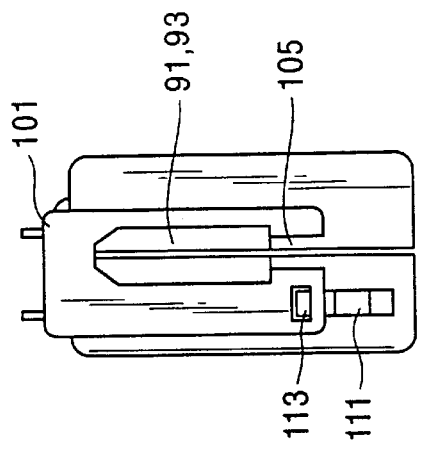
FIGS. 24A to 24C are illustrations of another embodiment of this invention, FIG. 24A being a plan view showing a battery case, FIG. 24B being a plan view showing a state where the battery case is mounted on a bracket, and FIG. 24C being a side elevational view showing the state where the battery case is mounted on the bracket.
Figure 24B:
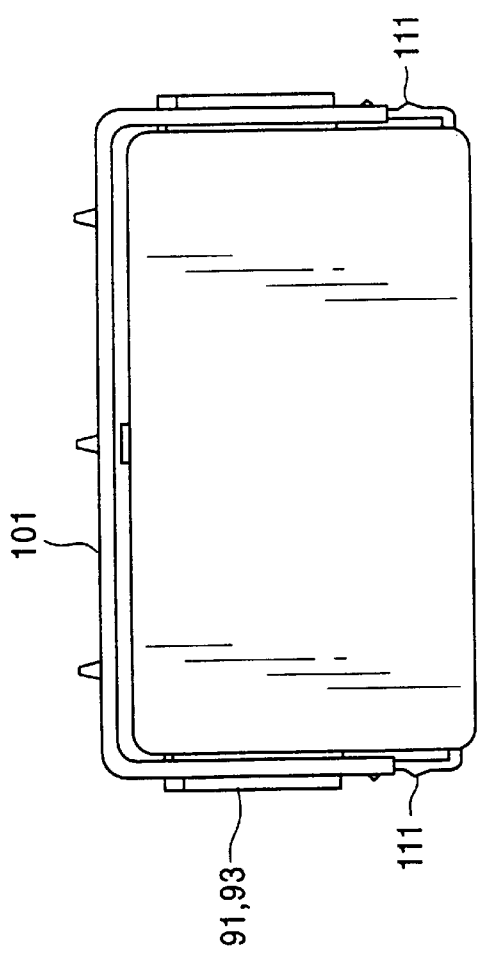
Figure 24A:
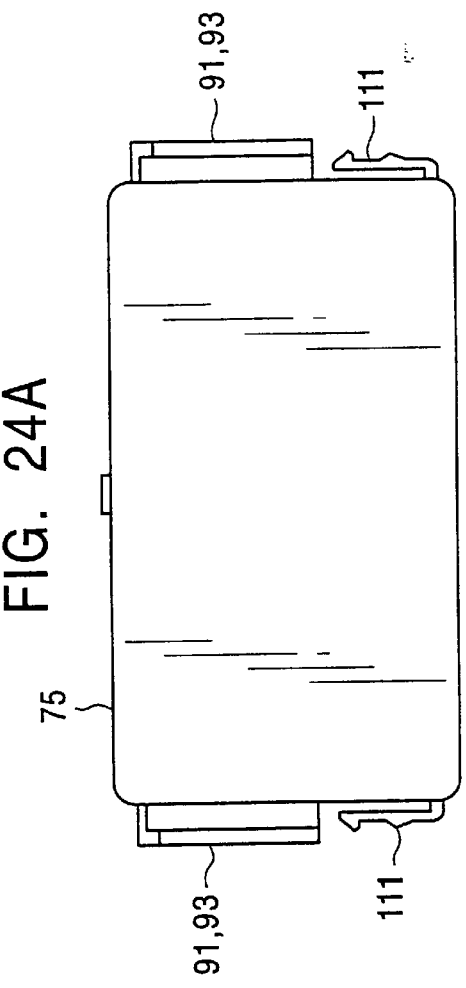

FIGS. 24A to 24C are illustrations of another embodiment.

In this embodiment, in addition to the aforesaid protruding members 91, 93, a pair of plate-spring-like locking members 111 are formed integrally on the battery case 75. Further, openings 113 engaging with the locking members 111 to be capable of locking with each other are made in the bracket 101.

In the above-described embodiment, although the construction in which the protruding members 91, 93 are engaged with the grooves 105 of the bracket 101 is employed, in the case that it is used at a position or portion where there is a possibility that the protruding members 91, 93 come out of the grooves 105 due to vibrations of the motor vehicle or the like, it is desirable to employ a construction in which the locking members 111 are engaged with the openings 115 to be capable of locking.

Although this invention has been described on the basis of the described embodiment, the invention is not so limited. For instance, in the case of fixing the battery case 75, according to this embodiment, through the use of the bracket 101, the battery case 75 can be fixed to any portion such as a fixed section of the motor vehicle and another control unit in the so-called screwless condition.

In addition, although, in the description of the embodiment, the pair of protruding members 91, 93 are together fitted in one groove 105 of the bracket 101, this arrangement is not limited to a single groove, and it is also possible to use two or more grooves.

According to the first aspect of this invention, because of employing the mechanism in which a control panel is tilted manually, this invention is suitable applied to a record medium reproducing apparatus in the case that the number of parts such as electrical devices substantially increases so that there is no space in which to place a tilting motor.

According to the second aspect of this invention, since a record medium is automatically ejected from a reproducing apparatus body when a control panel is manually tilted to the deepest position, the operational performance improves, and an eject switch can be omitted, which reduces the manufacturing cost.

According to the third aspect of this invention, without confirming a key position through, for example, viewing a key operation, depression of an input section is possible in a manner that a finger is moved to a fixed portion to confirm the key position and subsequently shifted to around the fixed portion, and therefore, it is possible to avoid inputting or the like in error although being carried out by a blind touch.

According to the fourth aspect of this invention, since a Mayday key is located in a recess position of a body case of a control panel, this Mayday key can not be pressed easily by mistake, which prevents the malfunction of a security system.

Furthermore, according to this invention, since an insertion section for a compact flash card is provided in the vicinity of a control panel, the operational performance in insertion and ejection of the card improves.

Still further, a holding member for holding the compact flash card is provided in the insertion section, which enhances the card holding force and provides an excellent vibration resistance.

In the first aspect of this invention, due to the employment of a mechanism for manually tilting a control panel, a motor for tilting the control panel is omissible. In addition, since a click sensation is obtainable when the control panel is tilted to a record medium ejecting position, the record medium ejecting position is confirmable by a touch, and if the insertion or ejection of the record medium is done after the confirmation of the record medium ejecting position, the insertion or ejection is safely and certainly achievable.

In the second aspect of this invention, since a record medium eject switch appears in front of a reproducing apparatus body to be pressable when a control panel is tilted to the record medium ejecting position, it is possible to prevent the record medium eject switch from being pressed in the middle of the tilting of the control panel.

In the third aspect of this invention, when a detection sensor does not detect a record medium ejecting position a control panel reaches, even if a record medium eject switch is pressed, the record medium is not ejected, so that the safety at the insertion and ejection of the record medium improves.

The fourth aspect of this invention can provide all the effects of the first to third aspects.

Moreover, according to this invention, since the release of a connecting member from a connection becomes possible only when a supporting plate is shifted to a connection release enabling position, the connecting member can not be released from the connection at positions other than it. Accordingly, a control panel can not be detached from the supporting plate, for example, in the middle of an ejecting operation of a record medium, and hence, the record medium does not run into the control panel during the ejecting operation, thus preventing the damages to the control panel and the record medium.

In addition, since the control panel can not be detached from the supporting plate, for example, when the supporting plate is in a tilted condition, the protrusion of only the supporting plate in front of passengers does not occur, which improves the safety.

Besides, in this invention, since protruding members formed on a case body of a battery case and a cover openable and closable are fitted in a groove of a bracket so that the battery case is fixed, so-called screwless fixing becomes possible to simplify the replacement of a battery.

While the invention has been shown and described with reference to a preferred embodiment thereof, it will be understood by those skilled in the art that various changes in form and details may be made therein without departing from the spirit and scope of the invention.

What is claimed is:

1. A vehicle-mounted record medium reproducing apparatus with a personal computer function comprising a control panel tiltable manually through a tilting link mechanism and placed in a front surface of a reproducing apparatus body to cover a record medium insertion opening of said reproducing apparatus body, wherein a record medium is controlled so as to be automatically elected from said reproducing apparatus body when said control panel is tilted to a deepest tilting position.

2. A vehicle-mounted record medium reproducing apparatus with a personal computer function according to claim 1, further comprising at least one key member having a predetermined function and placed on a control panel in a front panel of a reproducing apparatus body.

3. A vehicle-mounted record medium reproducing apparatus with a personal computer function according to claim 2, wherein said key member is a start key for operating said personal computer function, said start key being comprised of a fixed section and an input section positioned to be recessed from said fixed section.

4. A vehicle-mounted record medium reproducing apparatus with a personal computer function according to claim 3, wherein said key member is a Mayday key for issuing information on the occurrence of an emergency situation, said Mayday key being located at a recess position of a body case of said control panel.

5. A vehicle-mounted record medium reproducing apparatus with a personal computer function according to claim 1, which further comprises an insertion section for a compact flash card being provided in the vicinity of said control panel.

6. A vehicle-mounted record medium reproducing apparatus with a personal computer function according to claim 5, wherein said control panel is horizontally elongated and said insertion section for a compact flash card is provided in a vertically elongated space in said front surface of said reproducing apparatus body and adjacent to said horizontally elongated control panel.

7. A vehicle-mounted record medium reproducing apparatus with a personal computer function according to claim 1, which further comprises an insertion section for a compact flash card provided in the vicinity of said insertion opening.

8. A vehicle-mounted record medium reproducing apparatus as defined in any one of claims 5 to 7, wherein a holding member for holding an inserted compact flash card is provided in the interior of said insertion section.

9. A vehicle-mounted record medium reproducing apparatus according to claim 1, which further comprises a click sensation mechanism for providing a click sensation when said control panel is tilted to a record medium ejecting position.

10. A vehicle-mounted record medium reproducing apparatus according to claim 1, which further comprises a record medium eject switch which appears to be pressable when said control panel is tilted to a record medium ejecting position.

11. A vehicle-mounted record medium reproducing apparatus with a personal computer function, comprising:

a control panel tiltable manually through a tilting link mechanism and placed in a front surface of a reproducing apparatus body to cover a record medium insertion opening of said reproducing apparatus body, with a record medium being controlled so as to be automatically ejected from said reproducing apparatus body when said control panel is tilted to a deepest tilting position; and at least one key member having a predetermined function and placed on said control panel in said front surface of said reproducing apparatus body, said key member being a key selected from a group consisting of a start key for operating said personal computer function, including a fixed section and an input section positioned to be recessed from said fixed position, and a Mayday key for issuing information on the occurrence of an emergency situation and located at a recess position of a body case of said control panel.

12. A vehicle-mounted record medium reproducing apparatus with a personal computer function comprising:

a control panel tiltable manually through a tilting link mechanism and placed in a front surface of a reproducing apparatus body to cover a record medium insertion opening of said reproducing apparatus body; and a record medium eject switch which appears to be pressable when said control panel is tilted to a record medium ejecting position, wherein a detection sensor is provided which detects tilting of said control panel to said record medium ejecting position, and the record medium is ejected when the detection sensor detects the record medium ejecting position and said record medium eject switch is pressed.

13. A vehicle-mounted record medium reproducing apparatus comprising:

a control panel tiltable manually through a tilting link mechanism and placed in a front surface of a reproducing apparatus body to cover a record medium insertion opening;

a click sensation mechanism providing a click sensation when said control panel is tilted to a record medium ejecting position;

a record medium eject switch which appears to be pressable when said control panel is tilted to said record medium ejecting position; and a detection sensor which detects tilting of said control panel to said record medium ejecting position, wherein a record medium is ejected when said detection sensor detects said record medium ejecting position and said record medium eject switch is pressed.

14. A vehicle-mounted record medium reproducing apparatus in which a supporting plate is tiltable to cover a record medium insertion opening in a front surface of a reproducing apparatus body and a control panel is detachably fitted through a connecting member to said supporting plate, said connecting member being releasable from its connecting condition only when said supporting plate is moved to a connection release enabling position, wherein said connection release enabling position is a position at which said control panel stands up.

15. A vehicle-mounted record medium reproducing apparatus in which a supporting plate is tiltable to cover a record medium insertion opening in a front surface of a reproducing apparatus body and a control panel is detachably fitted through a connecting member to said supporting plate, said connecting member being releasable from its connecting condition only when said supporting plate is moved to a connection release enabling position, wherein said connecting member is comprised of a claw member placed on said supporting plate to detachably engage said control panel and a release lever for biasing said claw member provided on said reproducing apparatus body in a detaching direction, and said release lever biases said claw member in said detaching direction only when said supporting plate is moved to said connection release enabling position and a claw member release key on said control panel is pressed.

16. A vehicle-mounted record medium reproducing apparatus as defined in claim 15, wherein said claw release key is equipped with a rod whereby said release lever is pressable.

17. A vehicle-mounted record medium reproducing apparatus as defined in claim 15 or 16, wherein said connection release enabling position is a position at which said control panel stands up.

* * * * *